June 28, 1960 A. W. HULL 2,943,251
CONTROL OF MACHINE TOOL OPERATION
Filed Dec. 6, 1955 4 Sheets-Sheet 1
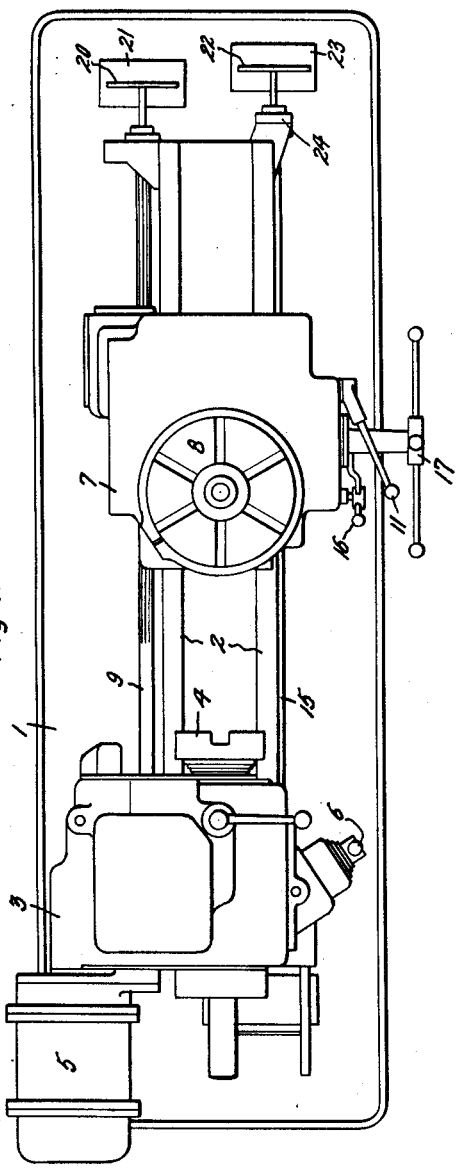
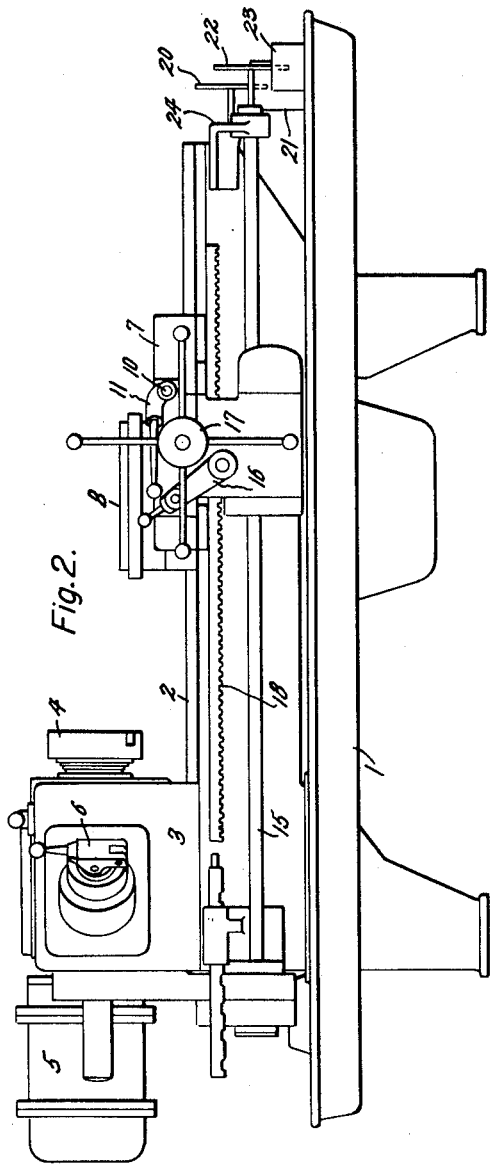
Inventor:
Albert W. Hull,
by Paul A. Frank
His Attorney.

June 28, 1960     A. W. HULL     2,943,251
CONTROL OF MACHINE TOOL OPERATION
Filed Dec. 6, 1955     4 Sheets-Sheet 2
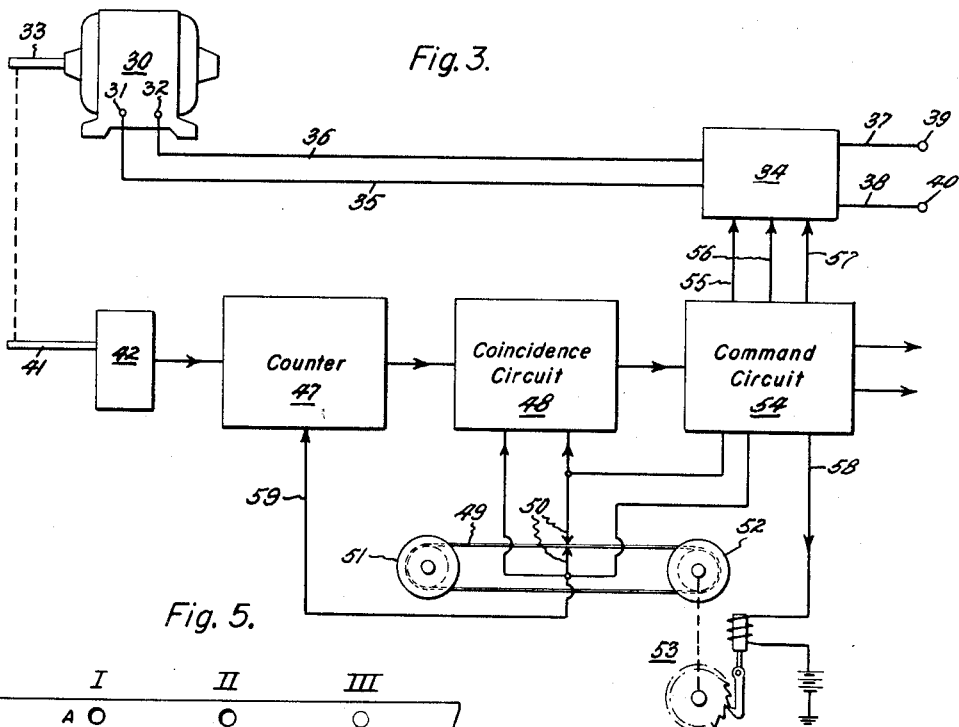
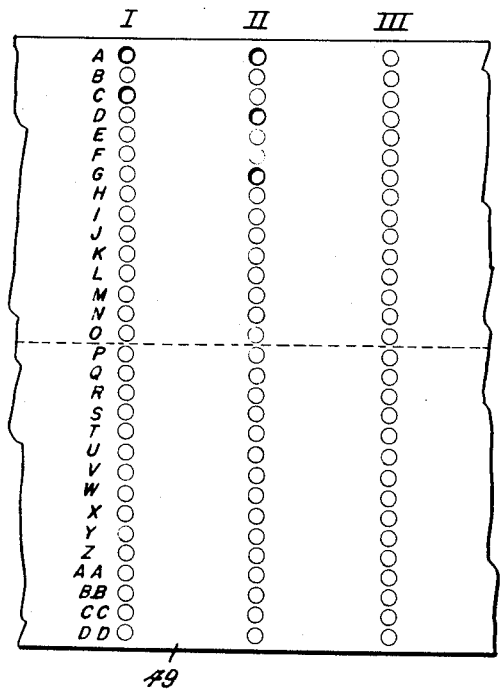
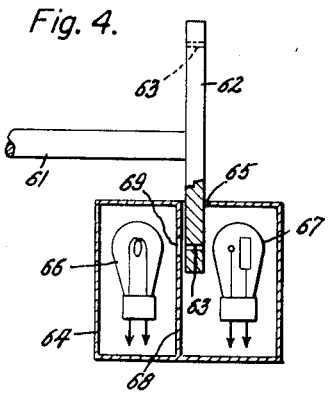
Inventor:
Albert W. Hull,
by Paul A. Frank
His Attorney.

Inventor:
Albert W. Hull,
by Paul A. Frank
His Attorney.

Inventor:
Albert W. Hull,
by Paul A. Frank
His Attorney.

United States Patent Office 2,943,251
Patented June 28, 1960

2,943,251
CONTROL OF MACHINE TOOL OPERATION

Albert W. Hull, Schenectady, N.Y., assignor, by mesne assignments, to General Electric Company, Schenectady, N.Y., a corporation of New York Filed Dec. 6, 1955, Ser. No. 551,368

12 Claims. (Cl. 318—162)

My invention generally relates to apparatus for the control of machine tools and more particularly to such apparatus whereby a series of different machine tool operations may be automatically and sequentially performed without manual resetting of the apparatus in accordance with information contained in a record.

Numerous types of equipments have been known whereby semi-automatic and automatic control of machine tools is accomplished. In one such type of equipment the record is in the form of mechanical stops whereby motion of the cutting tool in respect to the base is terminated when a portion of the tool holder abuts against the stop. Such a method of control is burdened with the inherent disadvantage that the record is periodically subjected to abutment by the tool holder resulting in a wearing down of the record surface such that the accuracy of the parts to be produced decreases during the life of the record.

It was later discovered that automatic control of a machine tool operation could be accomplished by means of a record wherein the shape of the information carrying indications on the record were independent of the shape of the piece to be machined. For example, in Patent 1,849,642, Schenker, such a control is provided by means of a mechanical counter working in conjunction with a punched tape, which is the record. Such mechanical counters and controllers are subject to wear, and, consequently, expensive both in regard to initial cost and to the cost of maintenance.

A principal object of my invention is, therefore, to provide new and improved apparatus and methods for the automatic control of the operation of a machine tool.

One object of my invention is to provide a new and improved device for the control of machine tools which is readily interchangeable from one machine to another.

A further object of my invention is to provide new and improved machine tool control apparatus capable of so controlling the operation of a machine tool that the machine tool is controlled to automatically and sequentially perform, without manual intervention, a series of preselected operations in accordance with information supplied to the apparatus in the form of a record.

Another object of my invention is to provide a new and improved machine tool control apparatus wherein the relative movement between the workpiece and the cutting tool is translated into a number which may be compared with a reference number contained on a record.

A yet further object of my invention is to provide a new and improved binary counting circuit and an assocaited circuit for utilizing a signal developed by the counter.

A yet further object of my invention is to provide a new and improved circuit whereby a predetermined relationship between two or more signals may be utilized to effect a single signal.

A yet further object of my invention is to provide a counter and associated utilization circuit wherein both addition and subtraction of input numbers are effective in producing a signal when the algebraic sum of the input numbers bears a predetermined relationship to a reference number.

A yet further object of my invention is to provide an all-electronic control for machine tools.

In the attainment of the foregoing objects in accord with one embodiment of my invention I provide a pulse generator in association with each drive element of the machine tool to be controlled. These generators produce a given number of electric pulses for a given movement of the portion of the machine to be controlled thereby. For example, in a machine lathe a pulse generator may conveniently be associated with the lead screw to signal the movement of the carriage along the longitudinal ways. The pulses from each such generator are coupled to a counting device wherein the number of pulses are totaled to effect a signal indicative of the relative position of that portion of the machine connected with the particular pulse generator. The position signal thus derived is compared with a reference signal contained on a record and the portion of the machine in question is moved until a predetermined relationship between the position signal and the reference signal exists. At this time the movement of the machine is stopped or otherwise modified in accord with the information supplied thereto, and the record is positioned to provide a reference signal for the succeeding operation of the machine, which automatically commences when the preceding operation has been completed. In addition to the controlling of the extent of the movement of a portion of the machine, other operations, such, for example, as rotation of the turret of a turret lathe to shift another tool into the cutting position, adjustment of the speeds of the various moving parts, and other controls to be more fully described hereinafter are effected in accordance with information contained on a record.

The characteristic features of the invention believed novel are set forth in the appended claims. The invention itself, however, together with further objects and advantages thereof may best be understood by reference to the following description taken in connection with the drawing in which:

Figure 1 is a top plan view and Figure 2 is a front elevation view of a turret lathe with which my invention may be incorporated;

Figure 3 is a block diagram of a control system embodying my invention;

Figure 4 illustrates a pulse generator suitable for use in apparatus embodying my invention;

Figure 5 is a cutaway view of a punched tape record suitable for use with my invention;

Figure 6:
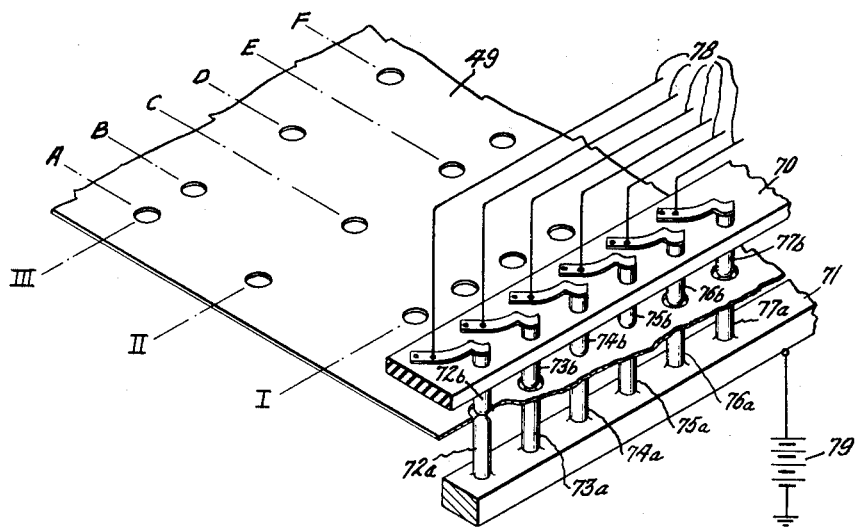
Figure 6 is a diagrammatic representation of one apparatus for obtaining electrical impulses from the tape of Figure 5.

In Figure 1 there is shown a turret lathe representative of machine tools with which my invention may be practiced. The lathe of Figure 1 is provided with a bed 1, a pair of ways or rails 2, and a headstock 3 having a rotary spindle and associated work-holding chuck 4. A motor 5 provided on and supported by headstock 3 is arranged through suitable gearing to drive chuck 4 at a selected one of a plurality of speeds. For manual selection of the different speeds, a control handle 6 is conveniently employed to adjust the gear ratio in the drive mechanism. A carriage 7 movable along ways 2 toward and away from headstock 3 supports a rotary turret having a base plate 8.

In this particular machine, which is illustrated merely to facilitate an understanding of my invention, two separate drive mechanisms are provided for moving the turret saddle toward and away from the headstock. One of these mechanisms includes a drive shaft 9 which is arranged rearwardly of the ways, parallel thereto, and extends throughout the length thereof. This shaft is driven by a separate motor, not shown, which is to the rear of the lathe bed. The drive mechanism driven from the drive shaft 9 is shown to be controlled by means of a shaft 10 which extends from front to back of the machine and is suitably journaled in saddle or carriage 7. Hand lever 11, located on the forward end of shaft 10 operates through a suitable mechanical coupling located between shaft 9 and shaft 10 to control the direction of motion of the saddle toward or away from the headstock. Since such couplings are well known to the art, and do not constitute a part of my invention, this coupling is neither described nor shown.

The second turret saddle drive mechanism includes a drive shaft 15 suitably journaled in the machine and extending along the forward face of the machine parallel to ways 2. A lever and associated shaft 16 are interconnected by suitable mechanical means to drive shaft 15 for properly connecting it to propel the turret saddle forward or backward as desired.

For moving the saddle toward or away from the headstock by hand, a handwheel 17 is provided. Turret face member 8 is provided with six symmetrically arranged tool holders whereby six different cutting tools may be employed. The turret may be angularly positioned either by hand or by means of a motor geared to the vertical axial shaft of the turret. Again, since such a drive mechanism does not constitute a part of my invention, and since such mechanisms are well known to the art, for purposes of clarity it is not described herein.

The portions of the machine so far described are conventional, and any machine which may have these or similar parts may be adapted for employment of my invention. In this particular machine, rotation of either driveshaft 9 or 15, depending upon which of the two is engaged to a pinion intermeshed with a rack 18, causes a movement of the turret head toward or away from the chuck. In the usual machine of this type one driveshaft is the high-speed coupling member and the other driveshaft is the low-speed coupling member.

In the turret lathe shown in Figure 1 and in most machine tools employed for the production of machined objects, it is desirable that as great a degree of flexibility as possible be achieved. For some purposes, greater efficiency may be obtained if the machine is manually operated whereas for the quantity production of articles of manufacture, fully automatic control of the machining operations is generally most economical, and hence, desirable. For other applications, semi-automatic control of the machining operations is most practical at this time. The flexibility in the operation of a machine tool in regards manual, semi-automatic and fully automatic operation is achieved by the use of a control mechanism constructed in accordance with the teachings of my invention.

As hereinbefore described, levers 11 and 16 may be manually positioned to select the high or low speed drive shaft and to determine the direction of movement of the turret saddle. Similarly, lever 6 may be manually adjusted to select the speed of rotation of the workpiece held in chuck 4 and the turret may be manually positioned to move the desired tool into operation. My control apparatus is readily installed on a machine to be controlled and determines the direction and speed of the motion of the carriage by controlling the energy supplied to the drive motor.

For example, if the drive motor has its rotor revolving in one direction and lever 11 is adjusted such that drive shaft 9 causes a movement of the turret saddle, a reversing of the direction of rotation of the rotor of motor 7 will cause the turret saddle to move in the opposite direction. Similarly, control over the slow speed drive shaft 15 may be effected by control of the electric circuit driving the motor. Also, whereas lever 11 may be adjusted to control the gear ratio of the drive mechanism between shaft 9 and the rotor of the drive motor, the speed of rotation of the motor may be adjusted to effect the same control. In a machine to be controlled in this way, it is convenient to employ direct-current motors since control of the magnitude and polarity of the current supplied thereto determines the speed and direction of rotation of the motor. When the automatic control apparatus is not in operation, manual control of the machine operations may, of course, be employed.

In a preferred embodiment of my invention a pulse generator including a disk 20 attached to an extending portion of drive shaft 9 and a pick-up device 21 are provided. A similar generator including a disk 22 attached to an extending portion of drive shaft 15 and a pick-up device 23 are provided. When energized, these generators produce a number of pulses proportional to the degree of rotation of their respective drive shafts in either a clockwise or counterclockwise direction. Since the relationship between angle of rotation of the drive shaft and linear movement of the carriage is fixed for any given setting of levers 11 or 16, the number of pulses generated corresponds to the linear movement of the carriage. The circuity to which these pulses are supplied and the method of utilization thereof will hereinafter be described in detail.

It should be understood, however, that the use of my invention in cooperation with a machine having only one drive shaft or lead screw requires that only one pulse generator be employed. Furthermore, other means may be provided in conjunction with a machine tool to produce a series of pulses as a part of the machine is moved. I have found, however, that use of the drive shaft or lead screw enables the use of relatively simple generators without reducing the accuracy of the control achieved by the system.

In a machine tool of the type hereinbefore described, and similar types of machine tools, there are a number of movements which may be controlled, for example, linear motion of the turret saddle along the ways, rotation of the turret head, direction and speed of spindle rotation and motion of the tool with respect to the work piece. While each of these variables may be controlled by an electronic system in accord with my invention, for simplicity sake, my system will be described in detail with respect to the control of longitudinal motion of the turret saddle with respect to the head stock.

It should be understood, however, that similar units utilizing the same basic principles of operation will be used to control other moving parts of the machine. For example, in a machine lathe, the movement of the cutting tool toward and away from the principal axis of the piece being turned may be similarly controlled simultaneously with the control of the longitudinal movement of the carriage.

In Figure 3 there is illustrated, in block diagram form, a representative control system for a machine tool such, for example, as the turret lathe of Figures 1 and 2 wherein a single motor is employed to drive the turret saddle toward or away from the headstock. In this diagram, the carriage drive motor 30 has a pair of terminals 31 and 32 to which is supplied a unidirectional voltage to rotate shaft 33 of the motor. For simplicity of control, it is desirable that a direct current motor be employed. A control box 34 has connected to the output thereof a pair of conductors 35 and 36 which couple the energy from control box 34 to terminals 31 and 32 respectively. A pair of conductors 37 and 38 connect the input of control box 34 to a pair of terminals 39 and 40 respectively. A source of electric energy, as for example a dynamoelectric machine not shown, is connected across terminals 39 and 40 and may provide alternating or unidirectional current. If motor 30 is unidirectional-current operated and an alternating voltage source is used, it is necessary that control box 34 contain means for converting alternating current to unidirectional current, as, for example, a rectifier. Whether or not such means is employed, the adjustment of the apparatus in control box 34 is determinative of the magnitude and polarity of the voltage coupled therefrom across conductors 35 and 36 and hence to the motor. In its simplest form, control box 34 includes means for reversing the polarity of the voltage supplied to motor 30, as, for example, a double throw, double-pole switch with the terminals thereof cross connected such that in one position conductors 35 and 36 are respectively connected to conductors 38 and 37, and in the other position, conductors 36 and 35 are respectively connected to conductors 38 and 37. The position of the switch is, therefore, determinative of the polarity of the electric energy coupled to motor 30. Box 34 also may include a current-limiting means which may simply and conveniently be a rheostat or a potentiometer. The adjustment of this current-limiting means is determinative of the magnitude of the current supplied to the motor. Consequently, the speed and direction of rotation of the drive motor may be controlled by two input signals to the control box, one to position the switch, and one to adjust the rheostat or potentiometer. Shaft 33 which is attached to the rotor of motor 30 and extends beyond the casing thereof drives the driveshaft in a machine of the type hereinbefore described or may drive a lead screw in other types of machines. A shaft 41 which is mechanically attached to shaft 33 for rotation therewith at the same speed or at other speeds proportional thereto, has associated therewith means for generating a plurality of electrical signals indicative of the degree of rotation of shaft 40 as, for example, a pulse generator 42. As illustrated in the machine of Figure 1, shaft 41 is conveniently the driveshaft. This is, of course, not necessary since it is only required that shaft 41 have a speed of rotation directly related to the speed of rotation of the driveshaft, and any other rotating member in the particular drive mechanism may be used for this purpose.

Generator 42 is selected to produce a given number of pulses for a given angle of rotation of shaft 41. Because shaft 41 is geared to the turret saddle, the number of pulses generated within any interval of time is proportional to the movement of the turret saddle during the same time interval. Generator 42 produces pulses of the same polarity and in the same relationship with respect to saddle movement in either a forward or a backward direction. The reason for this characteristic will become apparent with a further understanding of the control circuits. The output of device 42, which is a plurality of like polarity electric pulses, is amplified and supplied to a means for totalizing the number of electrical signals received from the pulse generating means which may be a counter circuit 47. The output of counter 47 is in the form of an electric signal which when properly decoded indicates the number of pulses supplied thereto. A correlating means which may be a coincidence circuit 48 is connected to be supplied with the output of counter 47 and with a reference or control signal from a record tape 49 and pickup means 50 and produces an output signal which is indicative of the correlation between the signals supplied thereto from counter 47 and from pickup means 50. Tape 49 is positioned between the terminals of pickup device 50 and is mounted on a pair of spools 51 and 52, the latter of which is driven by record control means which may be a notching relay 53 for adjusting the position of record tape 49 with respect to pickup 50. Means for controlling the operations of the machine tool which may be a command circuit 54 is supplied with a signal from coincidence circuit 48 and also with a signal from pickup 50 and provides a plurality of output signals for controlling various portions of the machine. One of these outputs is used to control the polarity of current to motor 30 and another is used to determine the magnitude of the current. A third determines whether or not any current at all is supplied to the motor. Conductors 55, 56 and 57 couple these signals from the command circuit to control box 34. A fourth output 58 from command circuit 54 is used to control notching relay 53 which determines the position of record tape 49 with respect to the terminals of pickup 50. Other outputs may be used for other purposes and will be more fuly described hereinafter.

In general, pulse generator 42 may comprise a rotating apertured disk which interrupts a path of light between an incandescent lamp and a photoelectric discharge device, thus providing a source of pulsed electrical signals the number of which indicates the length of travel of turret 7 along the ways of the lathe. These pulses are fed into counter 47 which, in general, comprises a plurality of serially connected flip-flop multi-vibrator stages interconnected by interstage switches which may alternatively set the counter for addition or subtraction. The output from each of the counter stages of counter 47 is taken from an amplifier which amplifies the signal received from one of the multivibrator tubes and indicates either a "one" or a "zero" in the binary system, depending upon whether or not that particular tube is in the non-conducting or conducting condition respectively.

The output of counter 47 is fed into coincidence circuit 48 which also receives a signal directly from record tape 49 by means of pick-up device 50. Coincidence circuit 48 includes a plurality of tape operated relays in the output circuit of each of the counter stages, each relay being in series with an asymmetrically conductive device which is connected to a common terminal which connects with the control electrode of a gaseous discharge device. The gaseous discharge device becomes conductive when the signal received from the counter comes into coincidence with the signal received directly from pick-up device 50, indicating that the turret has traveled the distance indicated upon record tape 49. Coincidence circuit 48 also includes an inhibitor circuit comprising an inhibitor electron discharge device and a plurality of gas discharge devices connected between the outputs of the individual counter stages and the control electrode of the inhibitor discharge device. This inhibitor circuit operates to prevent false signals being transmitted by the coincidence circuit to the command circuit when the turret is moving away from the headstock and the counter is in the "subtract" position and is more fully described hereinafter.

Command circuit 54 includes a first series of relays, one associated with each command channel and adapted to be activated directly by tape record 49 by means of pick-up device 50. Command circuit 54 also includes a second series of relays one associated with each of the tape-operated relays and adapted to be operated thereby when the corresponding tape operated relay is closed and a signal is received from the coincidence circuit 48 indicating that the signals fed to coincidence circuit 48 by counter circuit 47 and by pick-up device 50 are in coincidence. At that time, command circuit 54 transmits a command or series of commands to control 34 to change the operation of motor 30 and also transmits a command to record control means 53 to advance record tape 49 into the next succeeding command position.

In Figure 4, there is illustrated a photoelectric type generator which meets the requirements of pulse generator 42 in Figure 3. Such a generator is more desirable than one wherein physical elements such as contact buttons and brushes are utilized to interrupt a circuit at a rate dependent upon the speed of rotation of a shaft. Where highly precise cuts are to be made, a rapid production of pulses is required giving rise to the problems of arc-over and wear in such mechanical generators. For example, where it is desired to control a lathe carriage to one ten-thousandth of an inch and the carriage travel is thirty-two inches, three hundred and twenty thousand pulses must be produced in one traverse of the ways.

In Figure 4, a shaft 61 having a degree of rotation proportional to the linear travel of the turret saddle has attached thereto for rotation therewith a disk 62 having a plurality of apertures 63 near the periphery thereof and parallel to the principal axis of shaft 61. The pick-up device comprises an enclosure 64 provided with a rectangularly shaped slot 65 in one wall thereof into which disk 62 protrudes. Enclosure 64 is positioned such that a portion of disk 61 including the apertured portion extends therein. In one side of the enclosure there is provided a source of light which may conveniently be in the form of an incandescent lamp 66 and in the other side of which is located a photoelectric discharge device 67. Means for preventing the light from passing from the source to the discharge device 67 other than through the apertures in the disk may be accomplished by providing a wall 68 provided therein which is located between lamp 66 and photoelectric device 67. An aperture 69 is provided in wall 68 at a point directly between the source of light and photoelectric device 67. It is thus apparent that flashes of light from lamp 66 will impinge upon the cathode of device 67 during those periods when the apertures in the disk are aligned with the lamp, the discharge device, and aperture 69.

The number of apertures 63 which are provided depends upon the relationship between the accuracy desired, the degree of rotation of shaft 61 and the amount of linear travel of the turret saddle. If, for example, one complete revolution of shaft 61 results in a two one-thousandths inch travel of the saddle, and it is desired to control the cut to one one-thousandth inch, two apertures are provided. The generator therefore produces one pulse for one one-thousandth inch travel of the saddle. If it is desired to control the cut to one ten-thousandth of an inch, then twenty apertures are provided such that one pulse is generated for each ten-thousandth of an inch of saddle travel. The principal requirement is that at least one pulse be produced for the minimum amount of carriage travel which may be tolerated from a desired dimension, i.e., if the tolerance of a dimension is one one-thousandth inch, then at least one pulse must be produced for each one-thousandth inch of travel of the saddle. In a preferred embodiment of my invention, only one pulse is produced for a movement of the saddle equal to the minimum tolerance of the operations to be controlled.

Because of the ease with which a binary counting system lends itself to electronic circuitry I have found it desirable to utilize the binary system in such a control system. As a consequence thereof, the number on the record corresponding to the stop position of the saddle must also be in the binary system or a conversion unit must be employed. I have found it more desirable to record the number on the tape in the binary system.

In Figure 5, there is illustrated a portion of tape 49. In this particular embodiment the portion of the tape above the dotted line is employed to record the number corresponding to the position to which it is desired to move the turret saddle. Direction of motion of the tape is from right to left. Above the dotted line each column contains fifteen channels which have been lettered A through O. These fifteen channels, in the binary system, represent powers of two beginning with the zero power, and the signal impressed in any single column is the summation of the digits recorded in that column. Thus, for example, in Figure 5, in column I, channel A representing the zero power of two (one) and channel C representing the second power of two (four) have been punched out and the remaining positions are imperforate. Column I therefore has marked upon it the digit five which is the sum of one and four. When column I is beneath the pick-up element 50, a reference signal corresponding to the digit five is coupled to the coincidence circuit. In column II of Figure 5, channels A, D and G have been punched out—their total corresponding to a signal of 73 which will be coupled to the coincidence circuit when pick-up element 50 is beneath column II. In column III no holes have been punched and the signal indicated therein is zero. Fifteen channels are provided for the position control portion of the tape because that many digits are required to indicate the number 32,000 in the binary system which in a preferred embodiment of my invention provides for an accuracy of one one-thousandth inch on a machine having a carriage travel of thirty-two inches.

The remaining portion of the tape below the dotted line is provided for other information to be transferred directly to the command circuit. Thus, for example, channel Q may contain a command directing counter 47 to add or subtract by controlling the relay-operated interstage switches. Other channels may contain commands controlling spindle speed and direction, turret rotation and any other operation desired to be automatically controlled. One column is provided for each operation. There are as many columns as there are operations to be performed.

In Figure 6 of the drawing there is illustrated diagrammatically one suitable means for transforming the information punched upon record tape 49 into electrical signals to command circuit 54 and other elements of the control circuits of the invention. In Figure 6, record tape 49 having a number of columns I, II and III of punch hole channels A, B, C, etc. passes between members 70 and 71 of pick-up device 50. A plurality of pick-up electrode pairs 72, 73, 74, 75, 76 and 77 having fixed electrodes 72a, 73a, 74a, 75a, 76a and 77a and vertically movable electrodes 72b, 73b, 74b, 75b, 76b and 77b contact the opposite surfaces of tape 49. When a punched hole site passes between a pair of electrodes as for instance 72a and 72b, contact is made therebetween through the punched hole and a command is sent to command circuit 54 or any other appropriate portion of the control circuit by means of conductors 78. Fixed electrodes 72a, 73a, 74a, 75a, 76a and 77a are interconnected and connected with a voltage source either unidirectional or alternating represented generally by battery 79. While one suitable pick-up apparatus has been shown by way of illustration it will be appreciated that many other types of pick-up devices, as for instance brush pick-ups and magnetic pick-up devices are equally suitable and may be utilized instead of the device of Figure 6.

Figure 7:
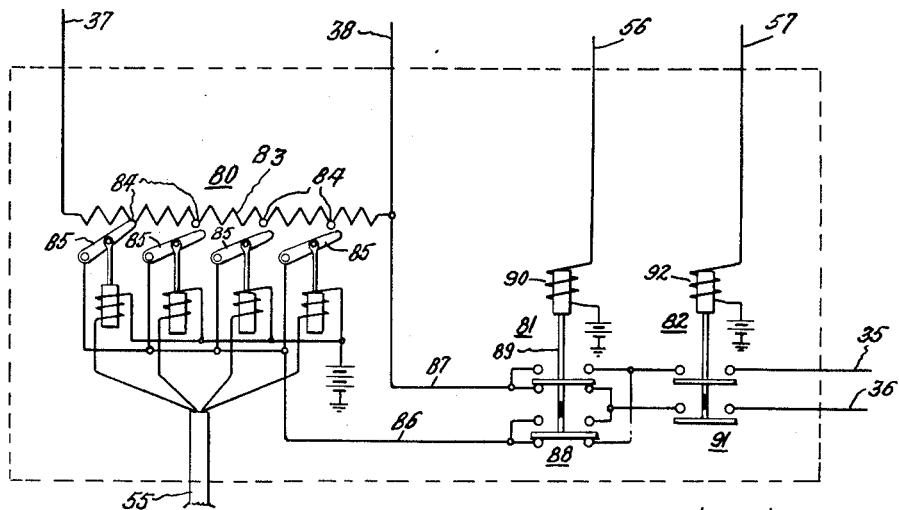
Figure 7 is a diagrammatic sketch of a typical control box which may be utilized in the control system of Figure 3.

In Figure 7 of the drawing there is shown a typical schematic sketch for control box 34 suitable to control, in response to commands from command circuit 54, the operation of motor 30 which drives the turret saddle along the ways. Control box 34 includes a speed control means 80, a motor reversing means 81 and an on-off switch means 82. Conductors 37 and 38 from terminals 39 and 40 which supply a source of potential, here assumed to be unidirectional since motor 30 is preferably a direct current motor, supply a unidirectional potential to potentiometer 83 which has a series of taps 84 located thereupon which correspond to a series of contact switch arms 85. Contact switch arms 85 are each individually responsive to a separate relay which operates in response to individual impulses received along a group of conductors represented on the block diagram of Figure 3 by conductor 55 from the command circuit. Each of the relays associated with potentiometer contact arms 85 operates in response to a separate relay in command circuit 54, which, in turn, operates directly in response to a separate command channel on punched tape 49. When it is desired to operate motor 30 at a speed corresponding to one of the taps 84 on potentiometer 83 (assuming a 4 speed potentiometer selector), any one of the four command channels designated for speed control are punched, the remaining three being unpunched. When pick-up device 50 is adjacent the punched row on tape 49, the punched speed control portion of the tape causes a designated command relay in command circuit 54 to operate a designated relay in speed control 80 of control box 34. The desired selector switch contact arm 85 contacts the corresponding potentiometer tap 84, supplying the proper voltage to direct current motor 30 to secure the desired speed of rotation.

Reversing switch means 81 comprises a double pole double throw switch 88 operated by relay 90. Relay 90 is directly controlled by a command circuit relay through conductor 56. The command circuit relay which actuates reversing switch relay 90 operates directly in response to a motor rotation direction signal punched upon tape 49. Conveniently, if this channel on tape 49 is punched, it may signal clockwise rotation; if it is unpunched, it may signal counterclockwise rotation. On-off switch means 82 of control box 34 may conveniently comprise a single throw, double pole switch 91 operated in response to relay 92 which is, in turn, operated by a corresponding command relay through conductor 57. It is to be appreciated that the representative diagram for control box 34 is given by way of example only and represents one of many similar arrangements which may be utilized in order to perform the functions of control box 34.

Figure 8:
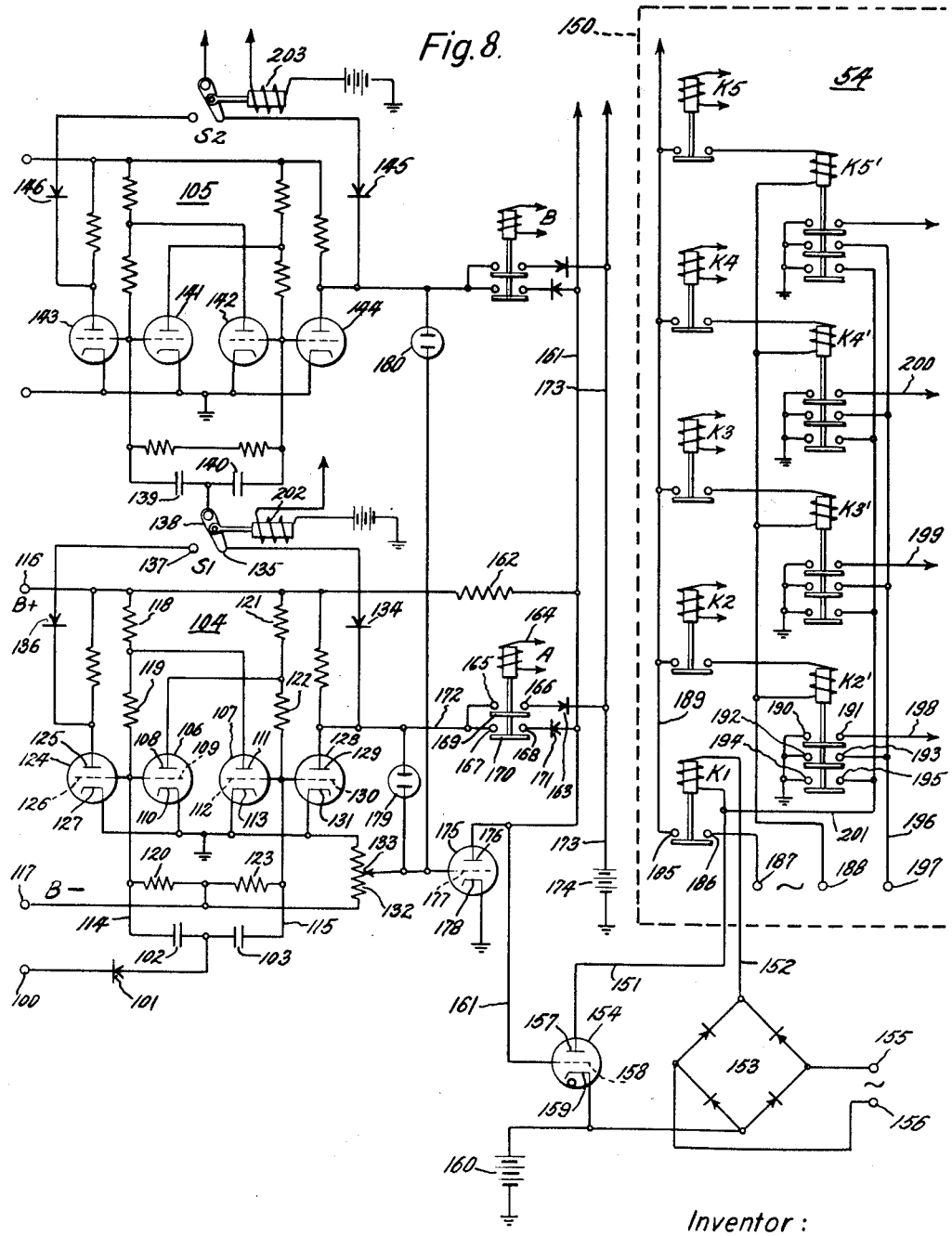
Figure 8 is a circuit schematic diagram of a portion of the control circuits as constructed in accordance with the teachings of my invention.

In Figure 8 there is illustrated, in schematic form, a portion of the electric circuit utilized to control a machine tool in accordance with the teachings of my invention. This diagram includes portions of the counting circuit, coincidence circuit, and command circuit. An input terminal 100 appearing at the lower left-hand corner of the figure is connected to be supplied with negative pulses from the pulse generator hereinbefore described. These pulses are coupled by means of an asymmetrically conductive device 101 to the junction between a pair of capacitors 102 and 103. Device 101 is poled to prevent voltage disturbances of positive polarity at terminal 100 from being supplied to the counting circuit. These pulses are divided and supplied to two portions of the first stage of a binary counter. In this particular illustration, only two stages, 104 and 105, of the complete counter are shown. It will be understood, however, that in a 15-digit counter, 13 additional duplicate stages are required. For purposes of illustration, however, only two such stages are shown, and since all of the stages are alike, only the first stage; i.e. stage 104 will be described in detail.

In this first stage, a bi-stable multivibrator comprises a pair of conventional triode discharge devices 106 and 107. Device 106 is provided with an anode 108, a control electrode 109, and a cathode 110. Device 107 is provided with an anode 111, a control electrode 112, and a cathode 113. Capacitor 102 is connected by means of a conductor 114 to control electrode 109, and a capacitor 103 is similarly connected by means of a conductor 115 to control electrode 112. A source of positive direct voltage is connected to a terminal 116, and a source of negative direct voltage or B— which may conveniently be —200 volts is connected to a terminal 117. The source connected to terminal 116 is the conventional B+ and may conveniently be 250 volts. A voltage divider including the series arrangement of resistors 118, 119 and 120 is connected between terminal 116 and terminal 117, and a similar voltage divider comprising resistors 121, 122 and 123 is connected in parallel with the first voltage divider between terminal 116 and terminal 117. The junction between resistors 118 and 119 is connected to anode 111, and the junction between resistors 121 and 122 is connected to anode 108. The junction between resistors 119 and 120 is connected to control electrode 109, and the junction between resistors 122 and 123 is connected to control electrode 112. A triode amplifier 124 having an anode 125, a control electrode 126, and a cathode 127 is provided for amplification of the signal appearing at electrode 109 and also as an isolation stage to prevent changes of conditions in one counter stage from tripping the multivibrator in the next preceding stage. A similar triode amplifier 128 having an anode 129, a control electrode 130, and a cathode 131 is provided for similar cooperation with discharge device 107.

A potentiometer in the form of a resistor 132 having an adjustable tap 133 located at an intermediate position thereof has one of its extremities connected to cathode 131 and the other extremity connected to terminal 117. Cathodes 110, 113, 127 and 131 are interconnected and grounded. An asymmetrically conductive device 134 is connected between anode 129 of discharge device 128 and a terminal 135 of a single-pole double-throw switch S1, herein referred to as an interstage switch, and an asymmetrically conductive device 136 is connected between anode 125 and terminal 137 of switch S1. These asymmetrically conductive devices are so poled as to conduct electrons away from the respective anodes to which they are connected. A common terminal 138 of switch S1 is connected to the junction of a pair of capacitors 139 and 140 which correspond in section 105 to capacitors 102 and 103 in section 104. Capacitor 139 is connected to supply a signal to the control electrode of amplifier 141, and capacitor 140 is connected to supply a signal to the control electrode of amplifier 142. Amplifier 143 is connected to amplify the signal appearing at the control electrode of device 141, and amplifier 144 is connected to amplify the signal appearing at the control electrode of amplifier 142. These last two named amplifiers correspond to amplifiers 124 and 128 in the first counting stage 104. An interstage switch S2 corresponding to switch S1 is provided between the second and third stages and functions in the same manner as does switch S1.

In this binary counter, each stage represents one digit of a number in the binary system, and the relative position of the stage in the line of stages corresponds to the position of the respective digit in the complete series. For example, stage 1 corresponds to the first digit, stage 2 corresponds to the second digit and so on for the number of stages in the counter. Furthermore, in this counter as shown, the right-hand tubes of the multivibrator discharge devices in the non-conductive stage correspond to "ones." Positioning of interstage switches S1, S2, and so on, in the right-hand position such that the signal from the anodes of the right-hand amplifiers are coupled to the succeeding stages adjusts the counter for addition. For subtraction, the switches are thrown to the left. Although not shown as such for purposes of a facile understanding of this portion of the system, it should be understood that these interstage switches are ganged together and are operable by automatic means as for example relays 202 and 203, in response to a signal from the command circuit.

Let it be assumed that the counter is in the "add" position and all right-hand multivibrator discharge devices are conducting such that each stage represents a "zero" and hence the counter reads zero. When the first negative pulse appears in the signal supplied to terminal 100, it is coupled by means of asymmetrically conductive device 101 and capacitors 102 and 103 to the control electrodes of discharge devices 106 and 107. By hypothesis, prior to the time of reception of this pulse, device 106 is non-conducting and the device 107 is conducting. When this negative pulse is supplied to each control electrode, however, device 107 is rendered less conductive by the negative pulse on the control electrode thereof such that the potential of anode 111 is increased causing an increase in the potential at the junction of resistors 118 and 119 which results in an increase in the potential difference appearing across resistor 120 and thus between control electrode 109 and cathode 110. This increase is sufficient to cause conduction of device 106 which lowers the potential of anode 108 which is coupled to the junction of resistors 121 and 122 and causes a further decrease in the potential of control electrode 112 such that device 107 is rendered further less conductive. This situation continues until device 107 becomes non-conductive and device 106 is in its maximum conductive state, as limited by the potential difference between terminals 116 and 117 and the relative values of resistors 118, 119 and 120. During this period, when tube 106 becomes conductive, the voltage appearing at the junction of resistors 122 and 123 rapidly decreases, and this decrease in voltage is amplified in device 128 and appears as an increasing potential of much larger amplitude at anode 129. This increase in signal is not coupled through asymmetrically conductive device 134 and hence has no effect on the condition of the succeeding stage of the counter.

When the next negative pulse, the second, appears in the signal supplied to terminal 100 from the pulse generator, the first counting stage 104 is caused to operate in the other mode of stability such that device 106 becomes non-conductive and device 107 becomes conductive. As device 106 becomes non-conductive, the potential of its anode sharply increases causing an increase in the potential difference across resistor 123 which is inverted in amplifier 128 and appears as an amplified potential decrease at anode 129. This negative signal is coupled through asymmetrically conductive device 134 to switch S1 and thence to the second counting stage 105. As described in connection with the first stage, this negative pulse trips the multivibrator of stage 105 to the other stable condition such that discharge device 142 originally conductive becomes non-conductive and discharge device 141, originally non-conductive, becomes conductive. The asymmetrically conductive device 145 connected to the anode of amplifier 144 prevents this signal from acting upon the next succeeding counting stage through switch S2. At this time, therefore, two negative pulses have been supplied to input terminal 100 and the counter reads two, the first stage represents the numeral zero, and the second stage represents the numeral one. The next input pulse, the third, trips the multivibrator in the first stage but has no effect on succeeding stages. At this time, the first two stages each represent the numeral one (1, 1) which corresponds to the number three in the binary system.

Let it now be assumed that the interstage switches are thrown to the left such that the counter is in the subtract position and represents the number three. At this time, therefore, discharge devices 107 and 142 are in the non-conducting state. The first negative pulse thereafter supplied to terminal 100 trips the first stage multivibrator, but because of the action of asymmetrically conductive device 136, has no effect upon the second stage. The counter therefore represents the number two. It will thus be seen that only every alternate pulse to each section of the counter causes a pulse to be coupled to the succeeding stage. Consequently, the requirements of a binary counter are met.

I have found it desirable to control the operation of machine tools without returning the moving part, such, for example, as the work holder, to a reference position after every cutting operation. Such a procedure reduces the movement of the carriage or other moving part and also obviates the need of an operator accurately setting the carriage after every set-up. If, for particular applications it is deemed expedient to provide difference information in the record, it is necessary that the counter be reset after each operation.

In accordance with one aspect of my invention, as embodied in the circuit of Figure 8, the record contains information as to the position along the ways at which the turret motion is to be terminated. Since the pulse generator produces pulses representative of a change in position of the turret saddle, it is necessary that the counter be able to add or subtract and also that the coincidence or AND circuit be able to distinguish between numbers which appear at the output of the counter as the saddle is moved in either direction. Consequently, correlation between the reference number on the record and the position of the saddle may be obtained. This problem and its solution are more fully described in detail hereinafter in connection with a discussion of the inhibitor portion of coincidence circuit 48.

A command circuit 54 which converts weak reference signals into power signals is enclosed within a dotted box 150 and will be more fully described hereinafter. At this time, however, it is necessary to assume that when the turret saddle reaches the desired position on the ways that a signal containing this information should be transmitted to the command circuit. A pair of conductors 151 and 152 are provided for coupling this signal from coincidence circuit 48 to command circuit 54. Conductors 151 and 152 are connected between the serial arrangement of a full-wave rectifying network 153 and an electron discharge device 154. Discharge device 154 may conveniently be a conventional gaseous discharge device commonly known as a thyratron. The rectifying network is connected to be supplied with an alternating current voltage external of the control circuit and is provided across terminals 155 and 156. This voltage may conveniently be of 110 or 220 volts. Discharge device 154 which serves to signal the command circuit when the coincidence circuit shows a coincidence between counter circuit 47 and tape 49, comprises an anode 157, a control electrode 158, and a cathode 159. A source of direct current potential 160, which may conveniently be a battery, is provided between cathode 159 and ground potential and maintains cathode 159 at a positive potential with respect to ground. The magnitude of this voltage may conveniently be approximately 75 volts. Conductor 161, which is connected to receive the output from the asymmetrically conductive devices comprising the AND portion of coincidence circuit 48 is directly connected to control electrode 158 of discharge device 154, and through resistor 162 to the B+ supply. Thus, when a positive signal appears upon conductor 161, having been coupled through the AND circuit, it is applied directly to control electrode 158, raising the control electrode potential above that of cathode potential, causing the tube to conduct. When discharge device 154 conducts, current passes through device 154 and into the command circuit actuating relay K1, delivering the coincidence signal to the command circuit and signalling the command circuit to operation.

Coincidence circuit 48 includes a plurality of record tape-operated relays labeled A, B, etc., one for each stage of the counter circuit. For example, relay A is provided for the first stage of the counter, and relay B is provided for the second stage of the counter. Relay A is provided with a pick-up coil 164, a first pair of contacts comprising contacts 165 and 166, and a second pair of contacts comprising contats 167 and 168. Relay striker plates 169 and 170 are respectively provided for each of these pairs of contacts. Contact 168 is coupled by means of an asymmetrically conductive device 171 to conductor 161. Device 171 is so poled as to conduct electrons away from terminal 168 and thus offers a conducting path from control electrode 158 of discharge device 154, through conductor 161, to anode 129, when anode 129 is at a low potential corresponding to a zero in stage 104. When current flows through device 171 due to the above condition, control electrode 158 of discharge device 154 is maintained at the same low potential as anode 129 and device 154 is maintained non-conducting. This condition prevails so long as any counter stage, the corresponding coincidence relay of which is closed, indicates a zero. Only when all such stages are "ones" will device 154 conduct and transmit a signal to the command circuit. When this occurs, the asymmetrically conductive devices, such as device 171, prevent any flow of current, and the potential of control electrode 158 is allowed to rise, permitting discharge device 154 to conduct and transmit a signal to the command circuit.

Contacts 165 and 167 are interconnected and coupled by means of a conductor 172 to anode 129 of counter amplifier 128. A conductor 173 is connected to a source of positive unidirectional potential represented generally as battery 174, and through asymmetrically conductive device 163 which is poled so as to conduct electrons away from conductor 173, through terminals 166 and 165, when relay 164 is closed, to the anode 129 of amplifier 128. The function of this positive unidirectional potential will be more fully described hereinafter with respect to the inhibitor portion of coincidence circuit 48. Each of the remaining relays B, C, etc. is a counterpart of relay A and is similarly connected with a corresponding stage of counter circuit 47.

In operation, the coincidence circuit 48 operates to supply a signal to command circuit 54 to indicate that a particular operation has been completed. This occurs when a signal applied to coincidence circuit 48 by counter 47 is in coincidence with a signal applied thereto directly from record tape 49. This latter signal is in the form of signals transmitted to close predetermined numbers of coincidence relays A, B, etc. This closing of the preselected relays connects the right hand amplifier anodes of the corresponding counter stages directly to the control electrode 158 of gaseous discharge device 154. When the turret saddle has traveled the signaled distance along the ways of the lathe, the indicated counter stages will all indicate "ones" and the right hand multivibrator discharge device as, for instance, device 107 of stage 104 and 142 of stage 105 will be in the non-conducting condition. When this occurs, all of the indicated right hand counter amplifier discharge devices will exhibit a high anode potential. This high anode potential is coupled through the corresponding coincidence circuit relay as, for example, relay A, asymmetrically conductive device 171 and to control electrode 158 of gaseous discharge device 154. So long as less than all of the counter stages connected by the coincidence relays to control electrode 158 indicate the corresponding counter stage is a "one," device 154 will not conduct. When, however, all the indicated counter stages are "ones," control electrode 158 rises in potential and allows gaseous discharge device 154 to conduct, transmitting a signal through conductors 151 and 152 to the command circuit indicating that the desired operation has been completed.

In order to facilitate proper operation of coincidence circuit 48 when the counter is in the "subtract" position an inhibitor discharge device 175, including an anode 176, a control electrode 177 and a cathode 178, is provided. The cathode is connected to ground and the anode is connected to conductor 161. Control electrode 177 is connected to adjustable tap 133 on potentiometer 132 to bias the tube normally in the non-conducting condition. A gaseous diode discharge device 179, such, for example, as a neon glow tube, is connected between conductor 172 and control electrode 177. A similar gaseous diode discharge device 180 is connected between the anode of amplifier 144 in the second stage of the counter and control electrode 177. One such gas diode is provided for every stage of the counter, and in each case is connected between control electrode 177 of triode 175 and the anode of the right hand amplifier of the particular stage with which it is associated.

Electron discharge device 175 operating in conjunction with the gas diodes is employed to prevent improper firing of discharge device 154 as the turret saddle is moved in a rearward direction to a succeeding position when counter interstage switches are in the "subtract" position. Since a great many numbers in the binary system have ones in corresponding digits, the use of a simple switching circuit between the counters and conductor 161 is not sufficient. If, for example, the turret is in the number four position and is to be moved to the number one position, a relay A is energized. When the turret reaches the number three position, anode 129 of counter amplifier 128 would, in the absence of the inhibitor circuit, increase in potential and cause discharge device 154 to fire and signal that the turret is in the one position. The inihibitor circuit, more fully described hereinafter, prevents this and permits a firing of discharge device 154 only when those counter stages corresponding to closed relays are ones and no others are ones. If any other stages are ones, discharge device 154 cannot fire.

*Counter circuit operation*

Let is be assumed that the turret is in the zero position and the record contains the reference number three. Therefore, relays A and B are energized connecting the anodes of amplifiers 128 and 144 to conductor 161. When the first pulse is supplied to the counter, device 106 or the left-hand amplifier in the multivibrator of stage 104 becomes conductive and device 107 becomes non-conductive. Since no negative pulse is transferred to the succeeding stage, nothing changes in the remaining stages of the counter. When the second pulse is supplied to stage 104, however, device 106 becomes non-conductive and device 107 becomes conductive. This causes a negative pulse to be transmitted to the second stage of the counter, and device 141 becomes conductive and 142 becomes non-conductive. It is apparent that the first stage has returned to its zero position, and the second stage is now in the 1 position. As is well known, 10 in the binary system corresponds to the number two. Discharge device 154 has not fired because in all three cases, one or both of the anodes connected to conductor 161 is lower in potential than the cathode of device 154 and prevents the potential of conductor 161, and hence, the control electrode 158 from rising to the potential required to fire device 154. On the next succeeding pulse, the third, amplifier 107 is rendered non-conductive and amplifier 106 is rendered conductive. Again, no pulse is transferred to the succeeding stage. It will now be seen that the first and second stages of the counter correspond to "ones" and therefore, the potential of conductor 161 is able to rise to a value approaching the voltage of the anode of those amplifiers to which it is connected through the relays A and B. Since none of the amplifiers to which conductor 161 is connected are in the zero position, the potential rises and discharge device 154 becomes conductive transmitting a signal to command circuit 54, and actuating command relay K-1.

Now let it be assumed that it is desired to return the saddle assembly from a more advanced position as for example corresponding to the digit 3, corresponding to 11 in the binary system, back to the position corresponding to the digit 1 which in the binary system is represented by 0.1. This information is transmitted from record tape 49 to pick-up 50 which causes relay A in the coincidence circuit to be closed, all other coincidence relays remaining open. Since stage 104 (the first) of counter 47 is already in the non-conductive or one position, it might appear that this would cause device 154 to become conductive and cause command circuit 54 to indicate that the operation has been completed. This false signal is prevented in my circuit by the inclusion of inhibitor electrical discharge device 175, and gaseous tubes 179, 180, etc. connected respectively between the control electrode of discharge device 175 and the anode of the right hand amplifier tube of counter stages 104, 105, etc. respectively. In conjunction with the above enumerated devices and connections, I provide a second set of contacts and striker plates on each of the coincidence circuit relays A, B, etc. One terminal of this second set on each relay as, for example, contact 165 of relay A, is connected, when the relay is closed, through its counterpart, and an asymmetrically conductive device 163 to conductor 173, to which I apply a positive unidirectional potential. This potential is substantially lower than the value of the unidirectional potential applied to terminal 116 and is also low enough to be insufficient to cause breakdown of gaseous discharge devices 179, 180, etc. when impressed thereacross. This voltage may conveniently be 150 volts.

The above-described inhibitor circuit functions, when the counter is in the "subtract" position, substantially as follows: All the right hand amplifier anodes of the respective counter stages whose associated coincidence relays are closed, corresponding to the number received from record tape 49, are "locked in" at the potential applied to terminal 174 when in the "one" or non-conducting condition. Similarly, all of the corresponding tubes of the remaining counter stages, the associated relays of which are open, are not so "locked in." The anodes of these latter tubes, accordingly, when in the non-conducting condition, rise to the potential of terminal 116, exceeding the breakdown potential of the associated gas discharge devices 179, 180, etc. The gas discharge devices break down and raise the control electrode 177 of inhibitor discharge device 175 which then conducts. When device 175 conducts, control electrode 158 of gas discharge device 154 is kept at ground potential due to the potential difference developed across resistor 162 in the anode circuit thereof, effectively inhibiting the operation of device 154 and preventing the coincidence circuit from signalling command circuit 54 that the indicated operation has been performed. Such a command will be given only when all of the tape indicated counter stages are in the "one" position and all of the non-indicated counter stages are in the "zero" position.

For example, assume, the turret saddle is in the number 3 position and record tape 49 signals a return to number 1. Only relay A is energized and since device 141 in the second stage is conductive, the anode of amplifier 144 will approach B+ voltage, cause a breakdown in gaseous discharge device 180 and cause the control electrode 177 of device 175 to rise to the potential of the anode of amplifier 144 and thereby causing inhibitor 175 to conduct which, in turn, prevents gas discharge device 154 from firing. When, however, stage 105 is in the zero position, device 142 is conductive, device 141 is non-conductive, which causes a high potential in the control electrode of 144, resulting in a low potential at the anode thereof which is insufficient to break down the gas in device 180. Consequently, amplifier 175 is not rendered conductive by the second stage of the counter. Therefore, when the thirteen remaining stages are also in the zero position and only relay A is energized, device 154 will be rendered conductive when stage 104 is in the one position. With the interstage switches in the left-hand or "subtract" position, as the pulses are supplied to the counter, a subtractive process will occur until only the first stage is in the one position, and at that time, a signal will be transmitted to the command circuit which will indicate that the turret saddle drive mechanism corresponds to the reference number and should be stopped or its motion otherwise modified according to the command given by the tape to command circuit 54.

*Command circuit*

The command circuit 54 generally comprises a plurality of relays controlled in accordance with a record such, for example, as the lower portion of the punched tape of Figure 5. Conductors 151 and 152 which couple the signal from the counter and coincidence circuits to the command circuit are connected across the pick-up coil of a relay K1. Relay K1 is normally open in the de-energized position and is provided with a pair of contacts 185 and 186. Contact 186 is connected to a terminal 187. A source of electrical energy either direct or alternating is supplied across terminals 187 and 188. Terminal 185 is connected to a conductor 189. A plurality of command relays K2, K3, K4, and K5 are provided. There are as many command relays as there are commands to be performed. Typical commands to be given to a turret lathe, for example, are forward drive, backward drive, change speed, start, stop, etc. Each of these command relays K2, K3, K4, K5 is provided with a pair of normally open contacts, and any one or more relays may be energized in accordance with information contained in the record. For example, if energizing of relay K2 causes the drive motor to rotate in a clockwise direction and this condition is desired, then the information provided on the record will be such as to cause current to flow through the energizing coil of relay K2 which will close the contacts thereof. Each of these command relays has the contacts thereof serially connected with the pick-up coil of associated relays K2', K3', K4', and K5' between conductor 189 and terminal 188.

It may thus be seen that energizing of a command relay causes an energizing of its associated relay when relay K1 is picked up in response to a signal from the coincidence circuit. Each of the relays, K2', K3', K4', and K5', has three pairs of normally open contacts. In relay K2', one pair of contacts comprises contact 190 and contact 191, a second pair comprises contact 192 and contact 193 and a third pair comprises contacts 194 and 195. Contacts 190, 192 and 194 are interconnected and grounded. Contact 193 is connected to a conductor 196 which is in turn connected to a terminal 197. Therefore, when relay K2' or any of the other such relays is energized, conductor 196 and hence terminal 197 is grounded. Terminal 191 has connected thereto a conductor 198 which is connected to a utilization circuit. Conductor 198 is also grounded when relay K2' is energized. Similarly, conductor 199 is grounded when relay K3' is energized, and conductor 200 is grounded when relay K4' is energized. Each of the conductors 198, 199, 200 is connected to one of the command circuits, in such manner that when it is grounded the corresponding command will be carried out. When, however, any one of these relays is energized, terminal 197 is grounded. The right hand members of the third pair of contacts of relays K2, K3, K4, and K5 are connected to a common conductor 201 which is connected, via conductor 151, to the anode of the gas discharge device 154.

The signal appearing at terminal 197 is coupled to notching relay 53, and each time this terminal is grounded, the spool upon which the record tape is located rotates a sufficient amount to move the record tape to the next set of signals representative of the desired operation. Since such relays are well known in the art, for purposes of clarity, they will not be further described herein. It is sufficient to say that each time terminal 197 is connected to ground, the record moves to the next succeeding position. Thus each time relay K-1 is energized by the coincidence circuit, energizing a command relay K-2', K-3', etc., and a command is transmitted, the record is moved forward one position. Simultaneously, the closing of any of the relays K2', K3', etc. connects the anode of the gas discharge device 154 to ground. This interrupts the gas discharge, releasing relay K, and freeing device 154 for the next operation. Let it be assumed that the last command has just been executed such that relay K1 has been picked up and has caused a movement of the record to the next succeeding position through any one of the command relays which may have been closed for the preceding operation. At this time, therefore, the record has been moved one position forward, causing a new set of counting relays to be energized to correspond to the desired position of stopping or otherwise modifying the cutting operation. Additionally, a relay commanding the turret saddle to proceed in either the forward or backward direction, or to stand still has been energized. If the command is to move, the drive motor will begin to move in the indicated direction and continue to move until the number of pulses supplied to the counter equal the number represented by the sequence of counting relays closed in accordance with the information on the tape. When this point has been reached, discharge device 154 is rendered conductive, which causes an energizing of relay K1, which, in turn, energizes one of the control relays, say K5′, whose command relay K5 was closed by the tape, thus performing the command. Terminal 197 is also grounded, actuating relay 53 and causing a movement of the record tape to the next succeeding position. Conductor 201 is also grounded by relay K5′ temporarily grounding anode 157 of discharge device 154, which is then returned to the non-conducting condition, ready to transmit the next signal to the command circuit.

One of the greatest advantages to be gained from the control apparatus of this invention is that a machine tool controlled in accordance with this invention may readily perform a series of operation wholly in response to commands supplied thereto by a record tape. In this fashion, one command after another may be executed by the machine tool in proper sequence without manual intervention and with no necessity to further reset the machine from the previous operation. In accord with this feature the entire operation to be performed upon a particular work piece may be performed from beginning to end in response to the information contained in the record tape and the same information may be used repeatedly to perform the same series of operations upon successive pieces of work which are to be machined in the same fashion.

To more readily understand the overall operation of the control system of the invention, a typical sequence of operations to be performed on the turret lathe of Figure 1 will be described. This sequence of operation is only one of many which may be performed by the apparatus of the invention and is given as illustrative only and is not intended to limit the scope of the invention. Firstly, let it be assumed that the lathe saddle has a 32″ longitudinal travel and that the zero position is at the most remote position from the headstock. Secondly, with respect to Figure 5 let it be assumed that tape channels A through O are designated to contain the position information which controls the position of the turret saddle. Let channel P be designated to contain information to turn motor 30 on or off; when channel P is punched motor 30 is supplied with current. Let channel Q contain the information as to whether counter 47 is in the add or subtract position; when this channel is punched the counter is set to add. Let channels R, S, T and U be designated to contain motor rotation control information. Thus channel R, when punched, designates the slowest speed used for slow cutting, channel S, a faster speed for fast cutting, channel T, a yet faster speed, for slow free travel of the turret saddle, and channel U the fastest speed, for fast free travel of the turret saddle. Finally let channel V contain information controlling the direction of rotation of motor shaft 33 and consequently the direction of travel of the turret saddle. When this channel is punched let it be assumed that the turret saddle is directed to travel toward the lathe headstock and when it is unpunched the turret saddle is directed to travel away from the lathe headstock.

Let it further be assumed that a piece of solid cylindrical bar stock is supported within the chuck and extends 2″ therefrom, or to the 30″ mark along the lathe bed. Let it also be assumed that it is desired to drill a hole 1″ deep along the longitudinal axis of the bar stock supported within the chuck and that it is desired to withdraw the drill 3″ back from the exposed end of the bar. Let it also be assumed that a drill bit is inserted in the turret head with its tip at the turret index point.

The commands which may be given to the lathe control circuit are the following: First, for the turret saddle to proceed at fast free travel speed from the zero mark along the lathe bed to the 29000 mark (29″). Second, when the turret saddle has reached the 29000 mark on the lathe bed the commands will be given to proceed at slow free travel speed to the 30000 mark along the lathe bed. Third, when the saddle has reached the 30000 mark along the lathe bed and the end of the drill bit held therein is abutting against the exposed end of the solid bar stock, the command will be given for the turret saddle to proceed at fast cutting speed to the 30500 mark or to a position ½″ into the bar stock. Fourth, when the end of the drill bit has reached a point ½″ within the solid bar stock and within ½″ of the end of cutting stroke, the command will be given for the turret saddle to proceed at slow cutting speed to the 31000 mark (the end of the cutting stroke). This command is given in order that the cutting tool will approach the end of the desired cut at the slowest speed so that there will be no overshoot. Fifth, when the end of the cutting tool reaches the 31000 mark (the end of the cutting stroke) the command will be given to stop the turret travel. Sixth, after the turret saddle longitudinal motion has stopped the command will be given to reverse the motor and withdraw the bit from the hole at the fast cutting speed until the end of the bit just reaches the 30000 mark (the point of entry into the bar stock). Seventh, when the end of the cutting tool has emerged from the bar stock the command will be given for the turret head to proceed at slow free travel speed to the 27000 mark on the lathe bed, at which point the tip of the cutting tool will be removed 3″ from the work piece.

The above listed commands may be placed upon the record 49 as follows: The command column on tape 49 to first control the operation of the turret saddle is column I in Figure 5 of the drawing. Since the first commands are put into execution while the turret saddle is at the zero position along the lathe bed, the portion of column I above the dotted line (channels A through O, inclusive), are unpunched, indicating that the command is to be executed as soon as column I is aligned with pick-up device 50. The commands to be executed at that time are contained in the remaining channels of column I. Thus, channel P is punched indicating that the on-off current switch is to be in the on position supplying current to motor 30. Channel Q is punched indicating the counter 47 is to be in the add position. Channel U is punched indicating that current is to be supplied to motor 30 so as to move the turret saddle at the fast free travel speed. Channel V is punched indicating that the reversing switch is to be in the position to cause the turret saddle to move toward the head stock. Under these commands, the motor is supplied with current and the turret saddle begins to move at fast free travel speed toward the lathe headstock. As soon as the above commands have been given, notching relay 53 is actuated, advancing tape 49 so that column II on tape 49 comes into juxtaposition with pick-up device 50. As the turret saddle advances in response to the given commands, a number of pulses indicative of the motion of the turret saddle are generated by pulse generator 42 and fed into counter 47 which counts up to 29000, the number impressed upon column II which is now located in juxtaposition with pick-up device 50. When 29000 pulses have been produced by generator 42 and totaled by counter 47 the signal produced by counter 47 is in coincidence with signal produced by the counting portion of column II of tape 49. Coincidence circuit 48, indicating this, supplies a signal to command circuit 54, indicating that the commands contained in column II of tape 49 are to be executed.

The information contained in column II is as follows: Channels C, F, H, L, M and N are punched indicating that the command is to be executed when the counter records 29000. Channel P is punched indicating that the motor is to be on. Channel Q is punched indicating that the counter is to be in the add position. Channel T is punched indicating that the turret is to move in the slow free travel speed. Channel V is punched indicating that the saddle is to move toward the headstock. When the command circuit receives the various signals from this portion of column II of tape 49, the turret saddle is slowed down to the slow free travel speed as it approaches the work piece and notching relay 53 is actuated, moving tape 49 forward so that column III thereof is in juxtaposition with pick-up device 50. The counter portion of column III of tape 49 has channels D, E, H, J, L, M and N punched indicating that the next command is to be executed when the counter counts 30000. The turret saddle moves forward at the slow free travel speed while approaching the work piece. When counter 47 has counted to 30000, the signal supplied to the coincidence circuit therefrom is in coincidence with the signal applied from column III of tape 49, and the commands of column III are put into execution by a signal from coincidence circuit 48 to command circuit 54. These signals are as follows: Channel P is punched indicating that the motor is to be on. Channel Q is punched indicating that the counter is to be in the add position. Channel S is punched indicating that the turret is to proceed at the fast cutting speed. Channel V is punched indicating that the saddle is to proceed toward the headstock. These commands are put into execution, and simultaneously, notching relay 53 is actuated, moving tape 49 forward until column IV thereof is in juxtaposition with pick-up device 50.

The counter portion of column IV of tape 49 has channels B, E, H, I, J, L, M and N punched, indicating the number 30500. The turret saddle moves forward at the fast cutting speed until the number of pulses from pulse generator 42 reach 30500. Counter 47 counts to 30500 at which time the signal supplied to coincidence circuit 48 therefrom comes into coincidence with the information supplied from the counter portion of column IV of tape 49. When this occurs, a signal from coincidence circuit 48 is sent to command circuit 54 which causes the commands on the remainder of column IV of tape 49 to be executed. These commands are as follows: Channel P is punched indicating that the motor is on. Channel Q is punched indicating that the counter is in the add position. Channel R is punched indicating that the turret is to proceed forward at the slow cutting speed as it approaches the end of the cut to prevent overshoot. Channel V is punched indicating that the turret saddle is to proceed toward the lathe headstock. As these commands are put into execution notching relay 53 is actuated causing tape 49 to move forward until column V thereof is in juxtaposition with pick-up device 50. The turret saddle proceeds to move toward the headstock at the slow cutting speed until the signal representing the number of pulses generated by pulse generator 42 and counted by counter 47 comes into coincidence with the signal impressed on the counting portion of column V of tape 49. In column V channels C, D, H, K, L, M and N are punched, indicating that the next series of commands is to be put into execution when the turret saddle reaches the 31000 mark. When the turret saddle reaches this mark and 31000 pulses have been generated by generator 42 and counted by counter 47, coincidence circuit 48 sends a signal to command circuit 54 indicating that the command contained in the remainder of column V of tape 49 is to be put in execution. This command is as follows: Channel P is unpunched indicating that the motor is to be shut off. No remaining channels need be punched since, with the motor off, no further operation takes place.

Simultaneously, with the execution of the command turning the motor off, notching relay 53 is actuated, causing tape 49 to be moved forward until column VI thereof is in juxtaposition with pickup device 50. The counting portion of column VI of tape 49, like column V, has channels C, D, H, K, L, M and N punched, indicating the number 31000. Since the turret saddle is already at this position, the commands on the remainder of column VI are put into operation immediately, the slight delay during which the notching relay is advanced being sufficient for motor 30 to come to a stop and prepare the machine for the next operation. The commands contained upon the remainder of column VI of tape 49 are as follows: Channel P is punched indicating that the motor is to be on. Channel Q is unpunched indicating that the counter is to be in the subtract position. Channel S is punched indicating that the turret saddle is to move at the fast cutting speed and channel V is unpunched indicating that the turret is to move away from the headstock. Simultaneously, notching relay 53 is actuated advancing column VII of tape into juxtaposition with pick-up device 50.

The command is put into operation and the turret saddle begins to move away from the headstock, withdrawing the tool from the work piece at the fast cutting speed until the counter has subtracted the number of pulses sufficient to bring the indicated number thereof into coincidence with the number impressed upon the counting portion of column VII of tape 49. The counter portion of column VII has thereon channels D, E, H, J, L, M and N punched indicating the number 30000. Thus, the turret saddle moves away from the headstock at the fast cutting speed until the tool is withdrawn from the workpiece. At that time, counter 47 has subtracted to 30000 and the signal supplied by counter 47 to coincidence circuit 48 is in coincidence with the signal supplied from column VII of tape 49 and the commands contained on the remainder of that column are put into execution. These commands are as follows: Column P is punched indicating that the motor is to be on. Column Q is not punched indicating that the counter is to be in the subtract position. Column T is punched indicating that the turret saddle is to move at the slow free travel speed. Channel V is unpunched indicating that the turret is to move away from the headstock. As these commands are put into execution notching relay 53 is actuated and tape 49 is advanced one column so that column VIII of tape 49 is in juxtaposition with pickup device 50. The counter portion of column VIII has channels C, D, E, F, H, K, M and N punched indicating that the next command is to be put into execution when the turret saddle reaches the 27000 mark.

The turret saddle then proceeds to move away from the lathe headstock at the slow free travel speed until counter 42 has subtracted to 27000. When counter 47 indicates 27000 the signal supplied to the coincidence circuit 48 from counter 47 is in coincidence with the signal supplied to coincidence circuit 48 from the counting portion of column VIII of tape 49. A signal is then supplied from coincidence circuit 48 to command circuit 54 indicating that the commands contained in the remainder of column VIII are to be put into execution. The command impressed on the remainder of column VIII is as follows: Channel P is unpunched indicating that the motor 30 is to be turned off. No further signals need be impressed upon this column since, with the motor off, no further operation takes place. If, due to the high speed of travel at the time the motor is turned off, the turret saddle overshoots, the overshoot is not important, since the counter maintains its count and the overshoot introduces no error into the next succeeding operation.

The proposed cutting operation has thus been completed and the turret saddle has come to a stop ready to receive the next set of commands signaling further operations to be performed. These operations, like the foregoing described operations, may be performed without setting up the machine again or other further manual adjustments.

It may be seen that adaptation of a machine tool to control by apparatus embodying my invention merely involves the installation of one or more pulse generators on the machine and insertion of control boxes in each of the supplied lines to the drive motors of the machine. Each generator need not be only used with one counter but different generators may be arranged for feeding the same counter at different times. For example, in a machine having a plurality of carriage drive motors, such, for example, as the turret lathe of Figures 1 and 2, both generators may be connected to supply pulses to the same counter. However, correlation between the pulses produced by each generator and the distance of carriage travel is necessary. The use of the photo-tube generator with the rotating disk has the advantage of interchangeability of disks to effect different numbers of pulses per degree of rotation thereof.

The command circuit provides interdependence of the operation of the various parts of the machine under the control of a master tape. The particular selection of control outputs from the command circuit depends upon the number of parts of the machine to be controlled. The provision of a large number of tape controlled output signals gives the desired flexibility for application of the same control system to many different mechanisms.

Although the automatic machine tool control of my invention has been described particularly with respect to control of the longitudinal motion of the turret saddle along the ways of the lathe, it will be appreciated that the same sequence of counter coincidence and command circuits may be utilized to control other desired motions of the machine as, for example, spindle speed and tool feed. Additional and separate control circuits may be provided to effect such control to operate from a master tape either simultaneously with longitudinal saddle motion or, with proper command circuit interconnections, sequentially one after another. Furthermore, all of the electrical discharge devices utilized in the circuits of the invention, other than the gas devices, may be replaced by asymmetrically conductive devices known as transistors.

While my invention has been described with reference to a particular embodiment thereof, it will be understood that those skilled in the art may make many changes and modifications without departing from my invention. Therefore, by the appended claims I intend to cover all such modifications and changes as fall within the true spirit and scope of my invention.

What I claim as new and desire to secure by Letters Patent of the United States is:

1. Apparatus for the control of the longitudinal motion of a first portion of a machine tool moved with respect to a second portion thereof by an electric motor driven drive shaft, comprising pulse generating means connected with said drive shaft for producing an electric pulse for every predetermined degree of rotation thereof, totalizing means connected to be supplied with said pulses to totalize said pulses and produce an output signal indicative of the total number of pulses supplied thereto, record pickup and translation means for translating machine control information contained upon a program record into a voltage signal corresponding to a predetermined reference number, signal comparing means connected to be supplied with the output signal from said totalizing means and with the reference signal from said record pickup and translating means for comparing said signals and producing an electric signal when the numbers represented by the output of said totalizing means and said reference signal are in coincidence, and means operating in response to the output from said signal comparing means to modify the energization of said electric motor in accord with machine control information supplied by the record pickup and translation means.

2. Apparatus for precision control of the motion of a first portion of a machine tool driven to move with respect to a second portion thereof by an electric motor, comprising pulse generating means for producing a plurality of electrical signals representative of the amount of motion of said first portion with respect to said second portion, electronic totalizing means responsive to said electrical signals for totalizing the number thereof, record pickup and translation means for translating machine control information contained upon a program record into an electrical reference signal indicating the position of said first portion at which the motion thereof is to be modified, signal comparing means responsive to said totalizing means and to said record pickup and translation means, means for comparing the totalized electrical signals with the reference signal, and means responsive to said signal comparing means producing an electrical signal to modify the energization of said electric motor in accord with the machine control information supplied by the record pickup and translation means when the signal comparing means indicates coincidence between the totalized electrical signals and the reference signal.

3. Apparatus for precision control of the motion of a first portion of a machine tool driven to move with respect to a second portion thereof by an electric motor, comprising pulse generating means associated with the motion of said first portion for producing a plurality of electrical signals representative of the amount of motion thereof with respect to the second portion, electronic totalizing means responsive to said electrical signals for totalizing the number thereof, record pickup and translation means for translating machine control information contained upon a program record into an electrical reference signal indicating the position of said first portion at which the motion thereof is to be modified, and for supplying command information indicating the manner in which said motion is to be modified, signal comparing means responsive to said totalizing means and to said record pickup and translation means, means for comparing the totalized electrical signals with the reference signal, and means responsive to said signal comparing means and to said record pickup and translating means producing an electrical signal to modify the energization of said electric motor in accord with the machine control information supplied by the record pickup and translating means when the signal comparing means indicates coincidence between the totalized electrical signals and the reference signal.

4. Apparatus for precision control of the motion of a first portion of a machine tool driven to move with respect to a second portion thereof by an electric motor, comprising pulse generating means for producing a plurality of electrical signals representative of the amount of motion of said first portion with respect to said second portion; binary totalizing means responsive to said electrical signals for totalizing the number thereof and comprising a plurality of serially connected bi-stable multivibrator binary counter stages capable of indicating in the binary system a "one" or a "zero" and having a single input terminal and first and second output terminals, said one of output terminals being connected to the input terminal of the next succeeding counter stage; record pickup and translation means for translating machine control information contained upon a program record into an electrical supplying a reference signal indicating the position of said first portion at which the motion thereof is to be modified; signal comparing means responsive to said totalizing means and to said record pickup and translation means for comparing the totalized electrical signals with the reference signal and including a plurality of switch means, one of said switch means being connected to each of said binary counter stages and responsive to be selectively actuated by said record pickup and translation means, the combination of said switch means which are actuated corresponding to a number in the binary system equal to the reference signal, a gaseous electron discharge device responsive to said switch means to be rendered conductive when the totalized number of electrical signals is equivalent to the reference signal impressed upon said switch means; and means responsive to said signal comparing means for modifying the energization of said electric motor when said gaseous discharge device is in the conducting condition.

5. In apparatus for the precision control of the motion of the first portion of a machine tool with respect to a second portion thereof, wherein the motion of said first portion is to be modified at a predetermined position in accord with a reference signal, means for determining the position of said first portion at which the motion thereof is to be modified comprising binary totalizing means for totalizing a plurality of electrical signals indicative of the motion of said first portion and comprising a plurality of stages each of which is adapted to exist in a first and a second electrical condition; and signal comparing means operatively connected with and directly responsive to said binary counter and to said reference signal for comparing the totalized electrical signals with the reference signal and comprising a plurality of switch means one each associated with each of said stages of said binary counting means, said last-named means being responsive to a coincidence between said signals to develop an electrical signal when the first portion of the machine tool is in the position indicated by the reference signal as indicated by a coincidence between the reference signal and the binary counting means such that each binary counting stage, the associated switch means of which is in a first position, exists in said first electrical condition.

6. In apparatus for the precision control of the motion of a first portion of a machine tool with respect to a second portion thereof wherein the motion of said first portion is to be modified at a predetermined position in accord with a reference signal, means for determining the position of said first portion at which the motion thereof is to be modified, comprising binary totalize means for totalizing a plurality of electrical signals indicative of the motion of said first portion and including a plurality of serially connected identical binary counter stages, each comprising a bi-stable multivibrator capable of indicating either a "one" or a "zero" in the binary system depending upon the state of stability thereof, each of said stages having a single input terminal and a pair of output terminals, interstage switches connected between said stages to connect one or the other of the output terminals of each of said stages to the input terminal of the succeeding stage, and signal comparing means including a plurality of switch means one each of which is associated with each of said counter stages, said correlating means being responsive to said totalizing means and to said reference signal for comparing the totalized electrical signals with the reference signal to produce an electrical signal when the first portion of the machine tool is in the position indicated by the reference signal as indicated by each counter stage, the associated switch of which is closed, exhibiting a "one" in the binary system.

7. In apparatus for the precision control of the motion of a first portion of a machine tool with respect to a second portion thereof wherein the motion of the first portion is to be modified at a predetermined position in accord with a reference signal, means for determining the position of said first portion at which the motion thereof is to be modified comprising a multi-stage binary counter for totalizing a plurality of electrical signals indicative of the motion of said first portion; and signal comparing means responsive to said binary counter and to said reference signal for comparing the totalized electrical signals with the reference signal and including a plurality of switch means, one of said means being associated with each of said counter stages, certain of said switches being actuated in response to said reference signal to indicate the magnitude thereof, and a gaseous electron discharge device having an anode, a control electrode and a cathode, the control electrode thereof being connected to one terminal of each of said switch means, said gaseous discharge device being normally biased in a non-conducting state and being rendered conductive when all counter stages, the corresponding reference signal actuated switch means of which are actuated, indicate a "one" in the binary system whereby said conducting electron discharge devices indicate a "one" in the binary system whereby said conducting electron discharge device indicates that the first portion of the machine tool is in the position indicated by the reference signal.

8. In apparatus for the precision control of the motion of a first portion of a machine tool with respect to a second portion thereof wherein the motion of said first portion is to be modified at a predetermined position in accord with a reference signal, means for determining the position of said first portion at which the motion thereof is to be modified, comprising binary totalizing means for totalizing a plurality of electrical signals indicative of the motion of said first portion and including a plurality of identical serially connected binary counter stages comprising a bi-stable multivibrator capable of indicating either a "one" or a "zero" in the binary system depending upon the state of stability thereof, each of said stages having a single input terminal and a pair of output terminals, interstage switches connected between said stages to connect one or the other of the output terminals of each of said stages to the input terminal of the succeeding stage, and signal comparing means responsive to said totalizing means and to said reference signal for comparing the totalized electrical signals with the reference signal and including a plurality of switch means, one of said means being associated with each of said counter stages, certain of said switch means being actuated in response to said reference signal to indicate the magnitude thereof, and a gaseous electron discharge device having an anode, a cathode, and a control electrode, the control electrode thereof being connected to one terminal of each of said switch means, said gaseous discharge device being normally biased in the non-conducting state but being rendered conductive when all counter stages, the corresponding reference signal actuated switch means of which are actuated indicate a "one" in the binary system, whereby the conducting condition of said electron discharge device indicates that the first portion of the machine tool is in the position indicated by the reference signal.

9. A circuit for producing a voltage signal in response to coincidence of the output signals of a binary counter and of a reference source comprising a plurality of electromagnetic relays, one of said relays being provided for each stage of said counter and operable in response to signals from said reference source, a first gaseous electron discharge device having a first anode, a first cathode and a first control electrode, a first terminal of each of said relays being coupled to the output of the respective stages of said binary counter, and a second terminal of each of said relays being coupled to said first control electrode, a second electron discharge device provided with a second anode, a second cathode and a second control electrode and arranged in circuit to reduce the voltage at the first control electrode of the first gaseous electron discharge device in response to a positive voltage at the control electrode of said second electron discharge device, and a plurality of gaseous arc discharge devices connected one between each of said first terminals and the second control electrode of the second electron discharge device.

10. Apparatus for precision control of the motion of a first portion of a machine tool driven to move with respect to a second portion thereof by an electric motor, comprising pulse generating means for producing a plurality of electrical signals representative of the amount of motion of said first portion with respect to said second portion; a binary counter responsive to said electrical signals for totalizing the number thereof and comprising a plurality of serially connected bi-stable multivibrator stages capable of indicating in the binary system a "one" or a "zero" and having a single input terminal and a first and a second output terminal, said first output terminal being connected to the input terminal of the next succeeding bi-stable counter stage; record pickup and translating means for translating machine control information contained upon a program record into an electrical reference signal indicating the position of said first portion at which the motion thereof is to be modified; signal comparing means responsive to said binary counter and to said record pickup and translating means for comparing the totalized electrical signals with the reference signal and comprising a plurality of normally open relays, one terminal of which is connected to the second output of a corresponding binary counter stage, certain of said relays being closed in response to said record pickup and translating means to indicate the magnitude of the reference signal supplied therefrom, a gaseous electron discharge device having an anode, a cathode and a control electrode, the control electrode thereof being connected to a second terminal of each of said relays, and when said relays are closed, to the second output terminal of the associated counter stages, said gaseous discharge device being normally biased in the non-conducting state but being rendered conductive when all counter stages, the corresponding record pickup and translating means-operated relays of which are closed indicate a "one" in the binary system; and means responsive to said signal comparing means for modifying the energization of said electric motor when said gaseous discharge device is in the conducting condition.

11. Apparatus for precision control of the motion of a first portion of a machine tool driven to move with respect to a second portion thereof by an electric motor, comprising pulse generating means for producing a plurality of electrical signals representative of the amount of motion of said first portion with respect to said second portion; totalizing means for totalizing the number of electrical signals produced; record pickup and translating means for translating machine control information contained upon a program record into an electrical reference signal indicative of the position of said first portion at which the motion thereof is to be modified and for supplying command information indicating the manner in which said motion is to be modified, and including a record tape having a plurality of punch-hole columns thereon, each of said columns containing a plurality of separate command channels, each of which contains a separate command to be executed simultaneously with the remainder thereof; signal comparing means responsive to said totalizing means and to said record pickup and translating means for comparing the totalized electrical signals with the reference signal; and command means responsive to said signal comparing means for modifying the energization of said electric motor when the signal comparing means indicates coincidence between the totalized electrical signals and the reference signal and including a plurality of first switch means, one of which corresponds to each of the command channels on said record tape for executing the command thereof, a plurality of second switch means associated respectively with each of said first switch means and actuated by said record pickup and translating means for actuating said first switch means, and a third switch means connected in series with all of said second switch means and actuated in response to said signal comparing means when coincidence is indicated between the totalized electrical signals and the reference signal.

12. The apparatus of claim 11 in which the first switch means are each connected to execute a predetermined command, to advance the record tape to the next command column, and to reset the signal comparing means to receive the next set of signals.

References Cited in the file of this patent

UNITED STATES PATENTS

| | | |
|---|---|---|
| 2,537,427 | Seid et al. | Jan. 9, 1951 |
| 2,715,703 | Schuck | Aug. 16, 1955 |
| 2,736,852 | Nelson | Feb. 28, 1956 |
| 2,775,727 | Kernaham et al. | Dec. 25, 1956 |
| 2,792,545 | Kamm | May 14, 1957 |